(12) United States Patent
LaCroix

(10) Patent No.: US 7,999,537 B2
(45) Date of Patent: Aug. 16, 2011

(54) MAGNETIC SENSOR WITH HIGH AND LOW RESOLUTION TRACKS

(75) Inventor: Mark E. LaCroix, Winchester, NH (US)

(73) Assignee: Timken US Corporation, Canton, OH (US)

( * ) Notice: Subject to any disclaimer, the term of this patent is extended or adjusted under 35 U.S.C. 154(b) by 605 days.

(21) Appl. No.: 12/160,526

(22) PCT Filed: Jan. 12, 2007

(86) PCT No.: PCT/US2007/000784
§ 371 (c)(1),
(2), (4) Date: Jul. 10, 2008

(87) PCT Pub. No.: WO2007/084349
PCT Pub. Date: Jul. 26, 2007

(65) Prior Publication Data
US 2009/0009160 A1    Jan. 8, 2009

Related U.S. Application Data

(60) Provisional application No. 60/758,333, filed on Jan. 12, 2006.

(51) Int. Cl.
*G01B 7/30* (2006.01)
(52) U.S. Cl. .................................................. 324/207.25
(58) Field of Classification Search .................... None
See application file for complete search history.

(56) References Cited

U.S. PATENT DOCUMENTS

| | | | |
|---|---|---|---|
| 5,492,571 A | 2/1996 | Frosch et al. | |
| 5,680,042 A | 10/1997 | Griffen et al. | |
| 6,201,389 B1 * | 3/2001 | Apel et al. | 324/207.2 |
| 6,784,659 B2 * | 8/2004 | Haji-Sheikh et al. | 324/174 |

FOREIGN PATENT DOCUMENTS

| | | |
|---|---|---|
| EP | 1452834 | 9/2004 |
| JP | 02017411 A * | 1/1990 |

OTHER PUBLICATIONS

Search Report and Written Opinion from corresponding International Application No. PCT/US2007/000784 mailed on Jun. 29, 2007.

European Office Action for corresponding European Application No. 07709718.6-2213 dated Nov. 9, 2010.

* cited by examiner

*Primary Examiner* — Jay M Patidar
(74) *Attorney, Agent, or Firm* — Michael Best & Friedrich LLP

(57) ABSTRACT

A sensing apparatus that includes first and second magnet assemblies. The first magnet assembly includes first and second magnets that have respective first and second opposite magnetic fields, and respective first and second dimensions. The first dimension is relatively smaller than the second dimension. The second magnet assembly is positioned at a distance from the first magnet assembly. The second magnet assembly includes a third magnet that has a third magnetic field which is opposite to the first magnetic field.

6 Claims, 4 Drawing Sheets

MAGNETIC SENSOR WITH HIGH AND LOW RESOLUTION TRACKS

RELATED APPLICATION

This application claims the benefit of U.S. Provisional Application Ser. No. 60/758,333, filed on Jan. 12, 2006, the entire content of which is incorporated by reference herein.

FIELD

Embodiments of the invention relate generally to magnetic sensors, and particularly to magnetic sensors with high and low-resolution tracks.

BACKGROUND

Magnetic position sensors generally have two or more magnetic tracks. Each magnetic track accounts for a specific magnetic resolution, such as a high and low-resolution, and consists of a number of electromagnetic field generating magnets. These magnetic position sensors typically require a gap between the magnetic tracks in order to reduce magnetic crosstalk between the tracks. However, if the gap between the tracks is not sufficiently large, magnetic fields generated by the separate magnetic tracks interact with each other. As a result, accuracy of the sensors is compromised. On the other hand, while a large gap between the magnetic tracks reduces the magnetic crosstalk, the resulting magnet tracks are typically larger.

More particularly, the magnets of a high-resolution track are generally influenced by the magnets of a low-resolution track. For example, the South field of a low-resolution track that is adjacent to sections of a high-resolution track will superimpose a North field on the sections of the high-resolution track. In such cases, the superimposed North field will result in wider North poles of the high-resolution track than the South poles at zero crossings of the field generated by the magnets of the high-resolution track. The zero crossings generally represent a magnetic field strength generated by the magnets of the high-resolution track measured at different angular positions around the high-resolution track. Similarly, the North field of a low-resolution track that is adjacent to sections of a high-resolution track will superimpose a South field on the sections of the high-resolution track. In such cases, the superimposed South field will result in wider South poles of the high-resolution track than the North poles at the zero crossings of the field generated by the magnets of the high-resolution track.

SUMMARY

In one form, the invention provides a sensing apparatus that includes first and second magnet assemblies. The first magnet assembly includes first and second magnets that have respective first and second opposite magnetic fields, and respective first and second dimensions. The first dimension is relatively smaller than the second dimension. The second magnet assembly is positioned at a distance from the first magnet assembly, and includes a third magnet. The third magnet has a third magnetic field that is opposite to the first magnetic field.

In another form, the invention provides a sensing apparatus that includes high and low-resolution tracks. The low-resolution track includes a first magnet that has a first magnetic pole, and a first circumferential dimension. The high-resolution track is spaced apart from the low-resolution track, and includes a second magnet that has a second circumferential dimension and a magnetic pole which is substantially identical to the first magnetic pole. The high-resolution track also includes a third magnet that has a third circumferential dimension. The third circumferential dimension is different from the second circumferential dimension. The third magnet also has a third magnetic pole that is opposite to the first magnetic pole.

In yet another form, the invention provides a sensing apparatus that includes high and low-resolution tracks, and an opposite-field track. The low-resolution track includes a first magnet that has a first magnetic pole. The high-resolution track circumferentially surrounds the low-resolution track, is spaced apart from the low-resolution track by a first gap, and has a circumferential dimension. The high-resolution track includes a second magnet that has a magnetic pole which is substantially identical to the first magnetic pole, and a third magnet that has a third magnetic pole which is opposite to the first magnetic pole, and a pole superimposed from the first magnet. The opposite-field track also circumferentially surrounds the high-resolution track, is spaced apart from the high-resolution track by a second gap, and includes a fourth magnet having a fourth magnetic pole that is substantially identical to the first magnetic pole to reduce the superimposed pole from the first magnet.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Embodiments of the invention will also be described with reference to the accompanying drawing figures wherein like numbers represent like elements throughout. Certain terminology, for example, "top," "bottom," "right," "left," "front,"

"frontward," "forward," "back," "rear," and "rearward," is used in the following description for relative descriptive clarity only and is not intended to be limiting.

Embodiments of the invention relate to a sensing apparatus with high and low-resolution tracks. In some embodiments, the high-resolution track includes magnets of different dimensions that have opposing magnetic fields. The low-resolution track includes magnets of similar dimensions. Some of the magnets of the low-resolution track have magnetic fields that are opposite to the magnetic fields generated by some of the magnets of the high-resolution track, and therefore superimpose magnetic poles on the high-resolution track. Magnetic poles that are opposite to the superimposed magnetic poles are generated in the high-resolution track to cancel or compensate for the superimposed magnetic poles. In one embodiment, the dimensions of some of the magnets of the high-resolution track are configured to be relatively smaller than the dimensions of the other magnets of the high-resolution track to compensate for the magnetic fields generated by the magnets of the low-resolution track. In this way, effects due to the superimposed field can be canceled or reduced such that the North poles and the South poles have similar zero crossings.

Embodiments of the invention also provide a sensor apparatus including high and low-resolution tracks. Each of the tracks consists of a plurality of magnets, and each of the magnets generates a magnetic field. As a result, each of the tracks has an overall magnetic field and hence a magnetic field pattern.

Figure 1:
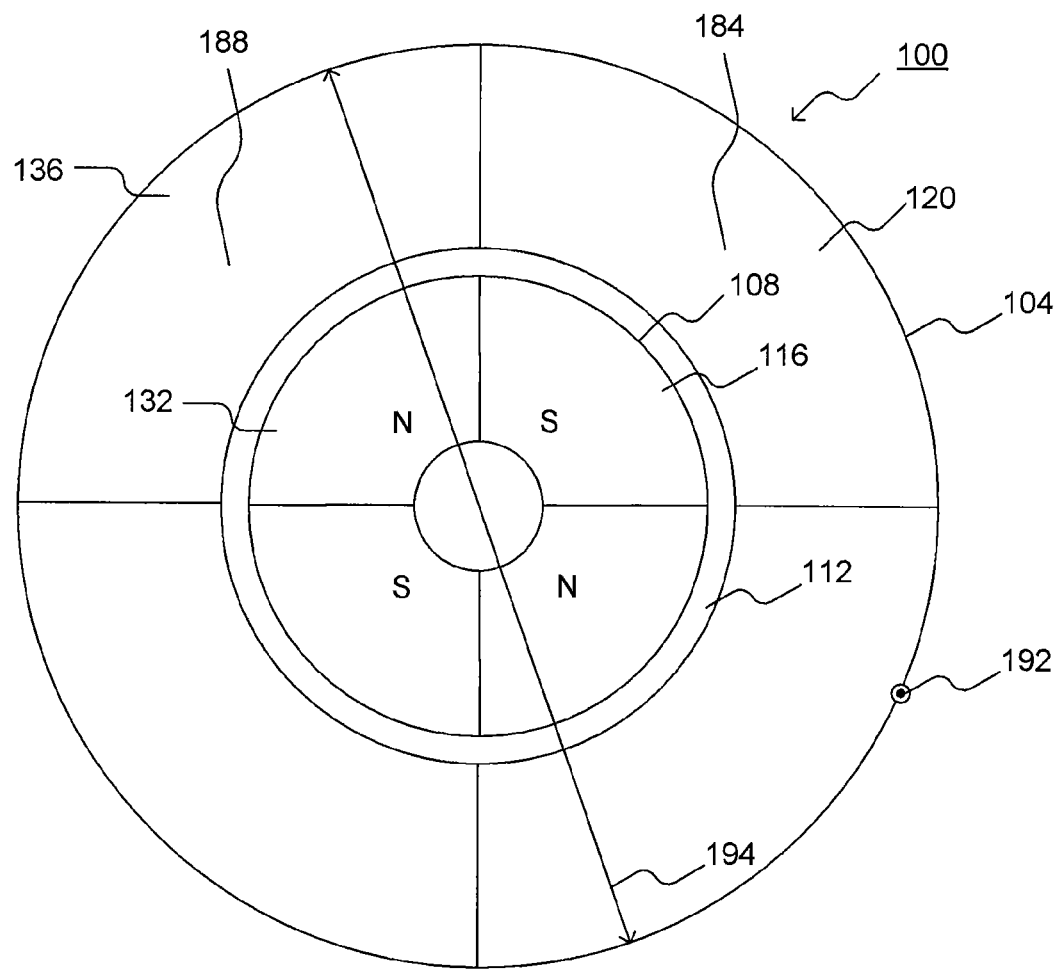
FIG. 1 is a top schematic view of a sensing apparatus having high and low-resolution tracks.

In some embodiments, the magnetic field pattern of the high-resolution track is generally structured to compensate for a North pole that is superimposed on the high-resolution track. FIG. 1 shows a top schematic view of a magnetic sensing apparatus 100 having a high-resolution assembly or track 104 and a low-resolution assembly or track 108. An exemplary magnetic sensing apparatus is a positional and directional sensing system incorporated in a motor. The high and low-resolution tracks 104, 108 are separated by a gap 112. While the South pole of a magnet 116 of the low-resolution track 108 superimposes a North pole on a section 120 of the high-resolution track 104, magnets of the section 120 are configured such that effects of the superimposed North pole are reduced or minimized. Similarly, while a North pole magnet 132 of the low-resolution track 108 superimposes a South pole on a section 136 of the high-resolution track 104, magnets of the section 136 are configured such that effects of the superimposed South pole are reduced or minimized.

Although the high and low-resolution tracks 104, 108 are shown as circular in shape, the high and low-resolution tracks 104, 108 can also have other shapes, such as elliptical shapes, polygonal shapes, and a combination thereof. Furthermore, although one low-resolution track 108 and one high-resolution track 104 are shown in FIG. 1, the sensing apparatus 100 can also include multiple high-resolution tracks, multiple low-resolution tracks, and/or a combination of multiple high and low-resolution tracks.

Figure 2:
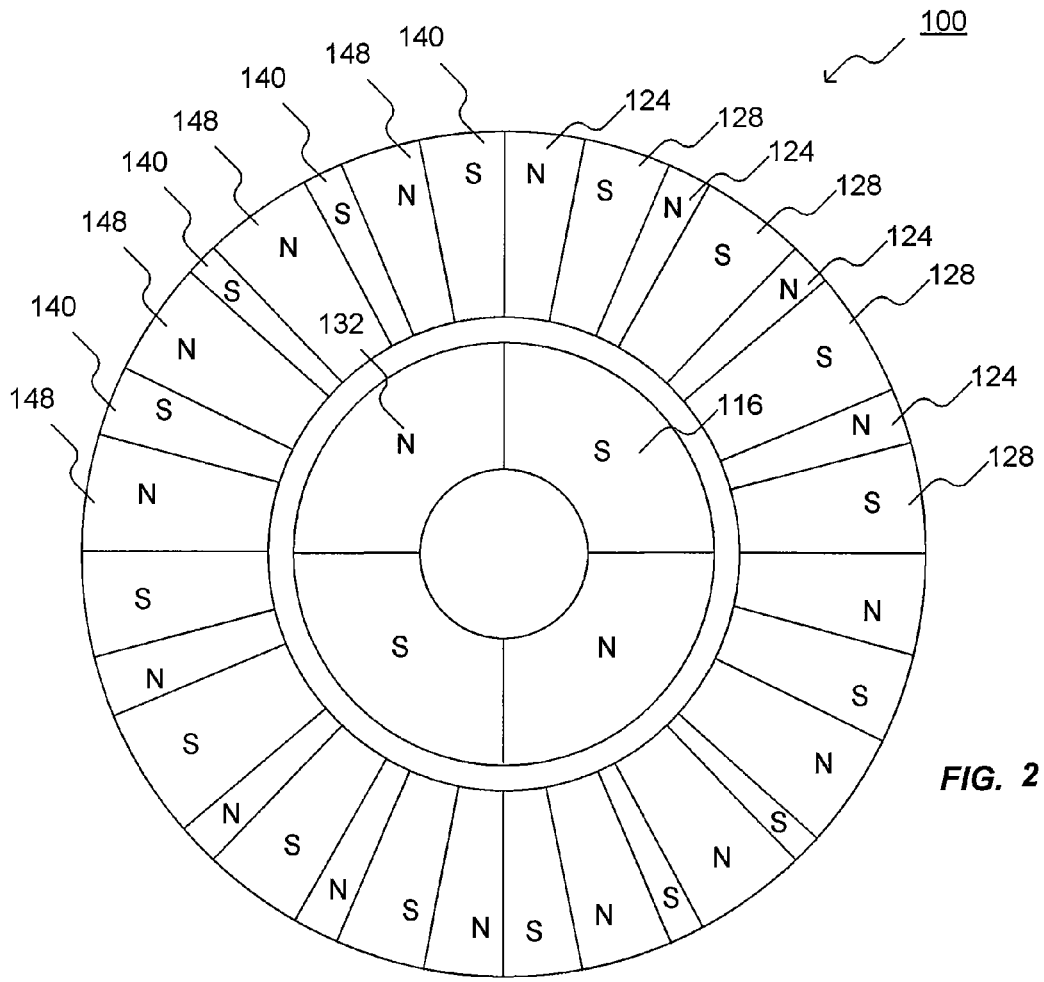
FIG. 2 is a detailed top schematic view of a plurality of sections of the sensing apparatus of FIG. 1.

FIG. 2 shows a detailed top schematic view of exemplary sections 120, 136 of the high-resolution track 104. Particularly, magnets 124 of the high-resolution track 104 that have an associated North pole are generally narrower than magnets 128 of the high-resolution track 104 that have an associated South pole, which will be detailed below. Similarly, magnets 140 of the high-resolution track 104 that have an associated South pole are generally narrower than magnets 148 of the high-resolution track 104 that have an associated North pole, which will be detailed below. FIG. 2 also shows that the magnets 124 near a center 184 of the section 120 are narrower than the magnets 124 away from the center 184 of the section 120 to provide more compensation near the center 184 of the section 120. Similarly, FIG. 2 also shows that the magnets 140 near a second center 188 of the section 136 are narrower than the magnets 140 away from the second center 188 of the section 136 to provide more compensation near the second center 188 of the section 136. Although the magnets 124, 128, 140, 148 are shown as wedge-shaped magnets, the magnets 124, 128, 140, 148 can also have other suitable regular or irregular shapes. Furthermore, the magnets 124, 128, 140, 148 can include a combination of permanent magnets, temporary magnets, electromagnets, and the like that are made of different materials, such as neodymium iron boron ("NdFeB" or "NIB"), samarium cobalt ("SmCo"), alnico, ceramic, ferrite, and the like.

In the embodiment of FIG. 2, the circumferential dimensions of magnets are reduced to minimize or reduce the magnetic pole effect. Other dimensions and parameters of the magnets of the high-resolution track 104 can be adjusted or structured such that there is an opposite, compensating, or canceling pole in the high-resolution track 104. For example, to provide more compensation near the center 184 of the section 120, the magnets 124 that have the superimposed poles in the high-resolution track 104 can be axially thinner near the center 184 and an axis that is parallel to an axis 192 of the high-resolution track 104 than the magnets 124 that are away from the center 184 of the section 120. In such embodiments, the magnets 124 that have the superimposed poles in the high-resolution track 104 can also be axially thinner than the adjacent magnets 128 to provide compensation for the section 120. Alternatively, to provide more compensation near the center 184 of the section 120, the magnets 124 that have the superimposed poles in the high-resolution track 104 can be radially smaller near the center 184 and along a diameter 194 than the magnets 124 that are away from the center 184 of the section 120. In such embodiments, the magnets 124 that have the superimposed poles in the high-resolution track 104 can also be radially smaller than the adjacent magnets 128 to provide compensation for the section 120. In other embodiments, the magnets 124 can be structured to radiate a magnetic field that is weaker in magnetic field strength than that of the adjacent magnets 128.

Figure 3:
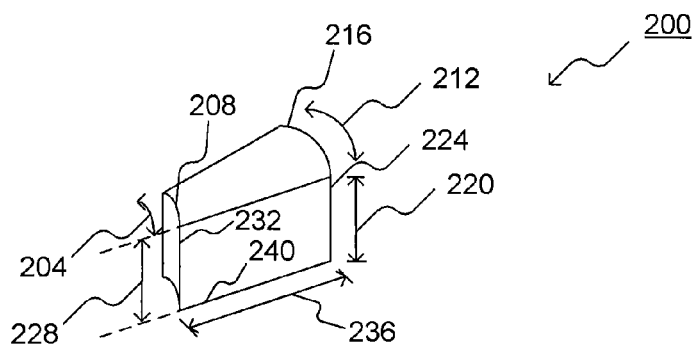
FIG. 3 is an exemplary wedge-shaped magnet used in the high and low-resolution tracks of FIG. 1.

FIG. 3 shows an exemplary wedge-shaped magnet 200 that can be used as the magnets 124, 128, 140, 148 of the high-resolution track 104 in FIG. 2. The magnet 200 has an interior or inner circumferential dimension 204 along a first circumferential portion 208 of the magnet 200, and an exterior or outer circumferential dimension 212 along a second circumferential portion 216. The magnet 200 also has an exterior or outer axial dimension 220 along an exterior axial edge 224 of the magnet 200, a second interior or inner axial dimension 228 along an interior axial edge 232 of the magnet 200, and a radial dimension 236 along a radial edge 240. Although the exterior axial dimension 220 and the second interior axial dimension 228 are shown as substantially equal in FIG. 3, the exterior axial dimension 220 and the second interior axial dimension 228 can be different in some other embodiments to provide magnetic pole compensation as desired. For example, to compensate for a superimposed magnetic pole, the exterior axial dimension 220 can be smaller than the second interior axial dimension 228 to lessen the respective magnetic field strength. Furthermore, as described, to compensate for the superimposed poles at the sections 116, 136, the magnets 124, 140 are narrower than the respective magnets 128, 148. In some embodiments, to compensate for the superimposed North pole at the section 116 (of FIG. 1), the inner circumferential dimension 204 of the magnets 124 is smaller than the inner circumferential dimension 204 of the magnets 128. The outer circumferential dimension 212 of the magnets 124 is also smaller than the outer circumferential dimension 212 of the magnets 128. Similarly, to compensate for the superimposed South pole at the section 136 (of FIG. 1), the inner circumferential dimension 204 of the magnets 140 is smaller than the inner circumferential dimension 204 of the magnets 148. The outer circumferential dimension 212 of the magnets 140 is also smaller than the outer circumferential dimension 212 of the magnets 148.

Figure 4:
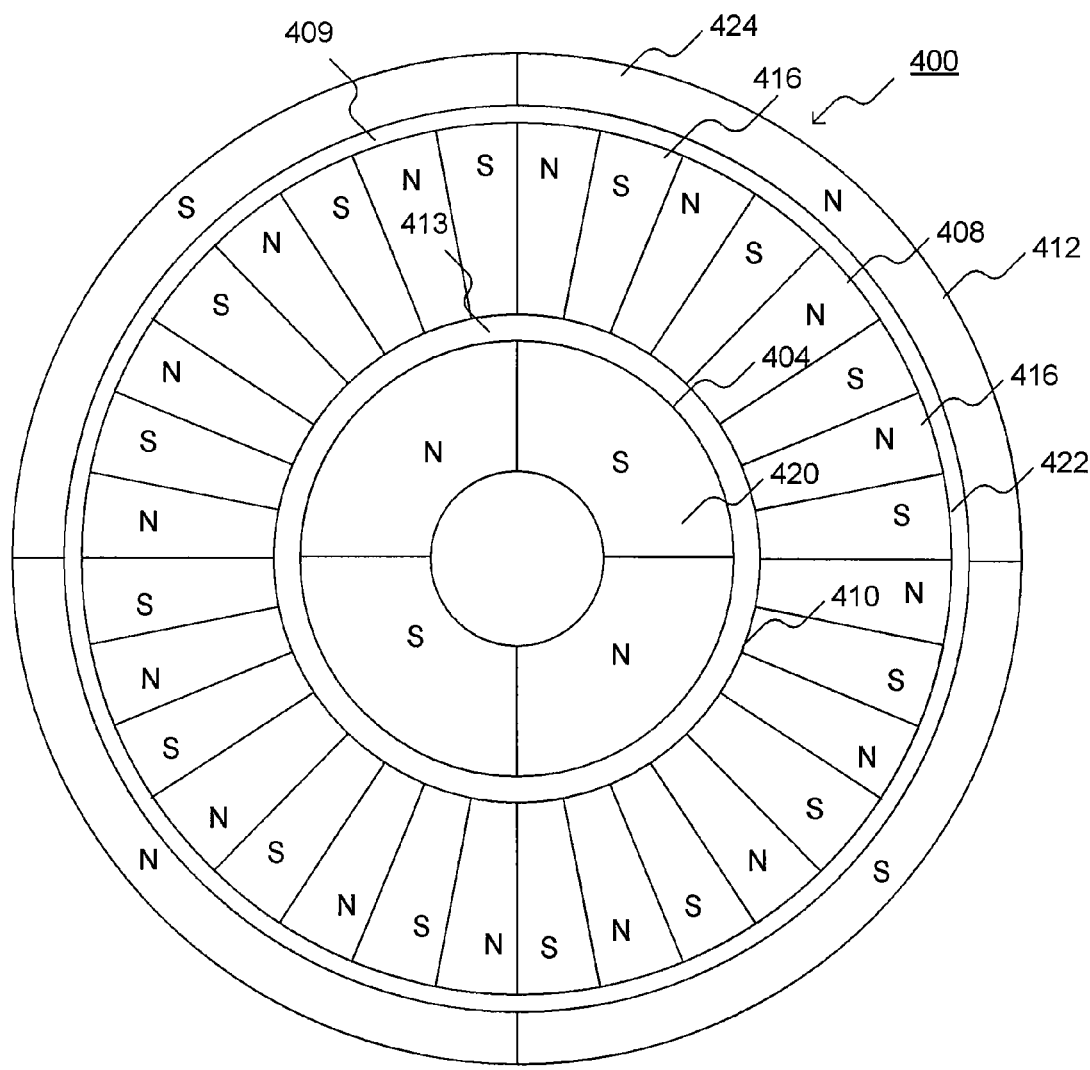
FIG. 4 is a top schematic view of an alternative sensing apparatus.

FIG. 4 shows a top schematic view of an alternative sensing apparatus 400. The sensing apparatus 400 includes a low-resolution track 404, and a high-resolution track 408 that are separated by a first gap 413. The sensing apparatus 400 also includes a compensation track 412 that is separated from the high-resolution track 408 by a second gap 409. The high-resolution track 408 has an interior circumference 410 that circumferentially surrounds the low-resolution track 404. Magnets 416 have essentially the same dimensions throughout the high-resolution track 408. As described earlier, the high-resolution track 408 is influenced by magnets 420 of the low-resolution track 404. The compensation track 412 circumferentially surrounds the high-resolution track 408 on an outer circumference 422. Particularly, the compensation track 412 provides a field of equal strength but opposite field direction relative to the field generated by the low-resolution track 404. The compensation track 412 generally includes a plurality of magnets 424 that generate an opposite field than the field generated by the magnets 420 of the low-resolution track 404 as described. Because the compensation track 412 is near the high-resolution track 408 and the low-resolution track 404, the magnetic field generated by the magnet 420 and superimposed on the magnets 416 of the high-resolution track 408 is nearly or completely canceled by the opposite field generated by the magnets of the compensation track 412. That is, a net field effect of zero or near zero from the low-resolution track 404 is measured at the high-resolution track 408.

Embodiments herein can be used to detect steering wheel position or wheel position, and can be used in other critical angle position sensing applications, robotic applications, packaging applications, and manufacturing assembly applications. Furthermore, embodiments herein can be used in other equipment, such as agricultural equipment, earth moving equipment, off-road equipment, forklifts, and on-road vehicles.

Figures 5A, 5B:
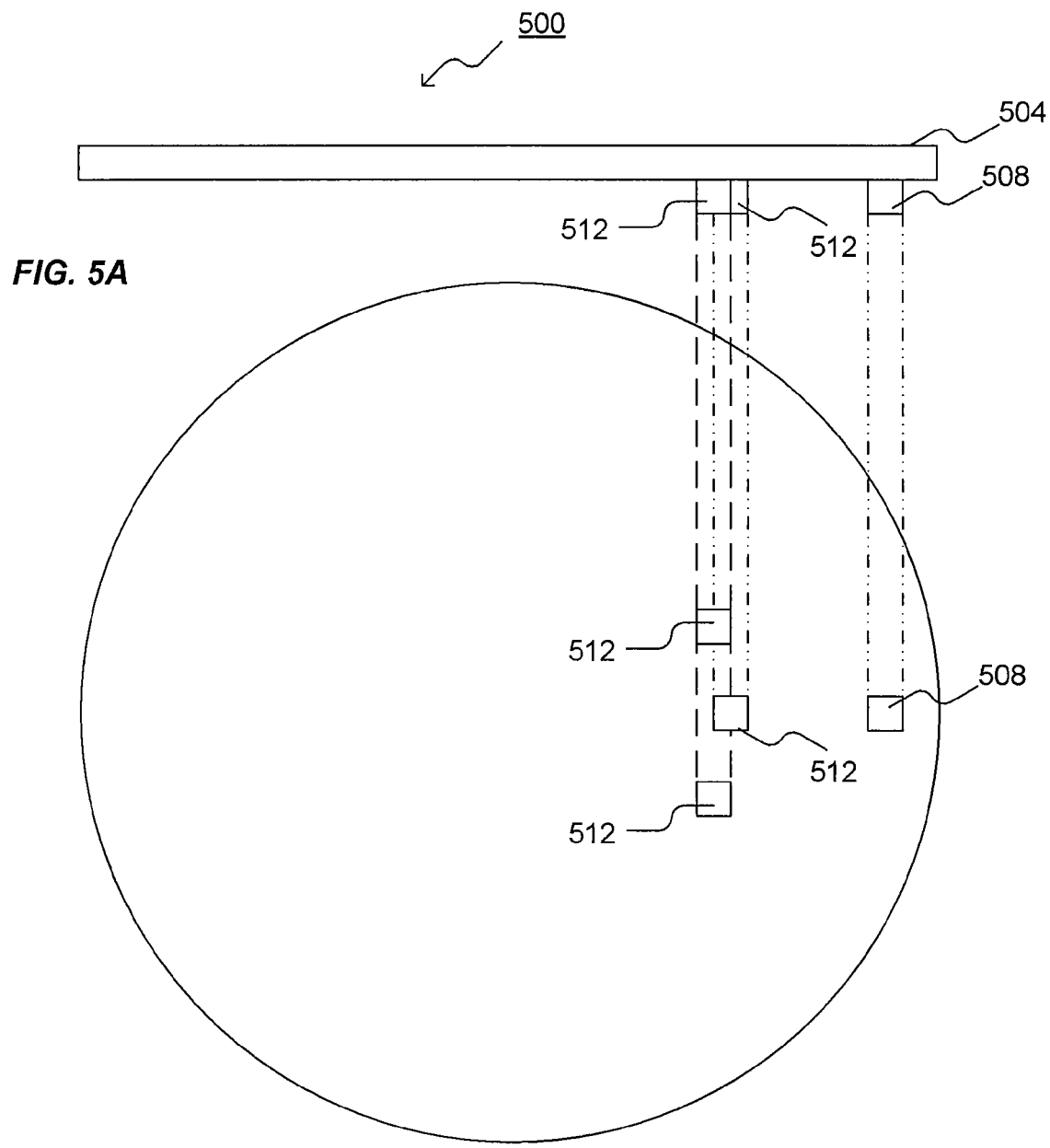
FIG. 5A is a side schematic view of a motor cap.
FIG. 5B is a bottom schematic view of the motor cap of FIG. 5A.

FIG. 5A and FIG. 5B respectively show a side view and a bottom view of a cap 500 of a motor (not shown). The sensing apparatuses 100, 400 can be incorporated in the motor near the cap 500. The motor cap 500 includes a printed circuit board 504 that includes a high-resolution sensor 508 and a plurality of commutation sensors 512. In some embodiments, the high-resolution sensor 508 is positioned near the high-resolution track 104, and the commutation sensors 512 are generally positioned near the low-resolution track 108 to obtain approximate absolute positions of the motor. Particularly, the commutation sensors 512 can be generally phased apart, such as by 120°. At startup of the motor, the commutation sensors 512 are energized, and thus an approximate absolute position of the low-resolution track 108 can be determined.

Thus, the invention provides, among other things, a sensing apparatus.

The invention claimed is:

1. A sensing apparatus comprising:
   a first magnet assembly including
      first and second magnets having
         respective first and second opposite magnetic fields
         wherein the first magnet has a plurality of dimensions including an inner circumferential dimension, an outer circumferential dimension, an inner axial dimension, an outer axial dimension, and a radial dimension, and the second magnet has a corresponding plurality of dimensions, and wherein the inner circumferential dimension or outer circumferential dimension of the first magnet is relatively smaller than the corresponding dimension of the second magnet; and
   a second magnet assembly circumferentially surrounded by the first magnet assembly and positioned at a distance from the first magnet assembly, the second magnet assembly including
      a third magnet having a third magnetic field opposite to the first magnetic field.

2. The sensing apparatus of claim 1, wherein the first magnet assembly is a high-resolution track, and wherein the second magnet assembly is a low-resolution track.

3. The sensing apparatus of claim 1, wherein the first magnet assembly has a magnet section, the magnet section having a center, the first magnet is positioned near the center, and the first magnet assembly further includes a fourth magnet having a fourth magnetic field opposite to the second magnetic field, wherein the fourth magnet is positioned adjacent the second magnet and away from the center, and has an outer circumferential dimension, wherein the outer circumferential dimension of the first magnet is relatively narrower than the outer circumferential dimension of the fourth magnet, and wherein the magnet section includes the first, second, and fourth magnets.

4. The sensing apparatus of claim 3, further comprising:
   an opposite-field track circumferentially surrounding the first magnet assembly, spaced apart from the first magnet assembly by a second gap, and including
      a fifth magnet having a fifth magnetic field that is opposite to the third magnetic field, and configured to reduce a superimposed pole from the third magnet.

5. The sensing apparatus of claim 1, wherein the first, second, and third magnets are wedge-shaped.

6. The sensing apparatus of claim 1, further comprising:
   at least one high-resolution sensor positioned near the first magnetic assembly, and configured to sense a position of at least one of the first and second magnets; and
   at least one low-resolution sensor positioned near the second magnetic assembly, and configured to sense a position of the third magnet.

* * * * *